Patented Nov. 13, 1951

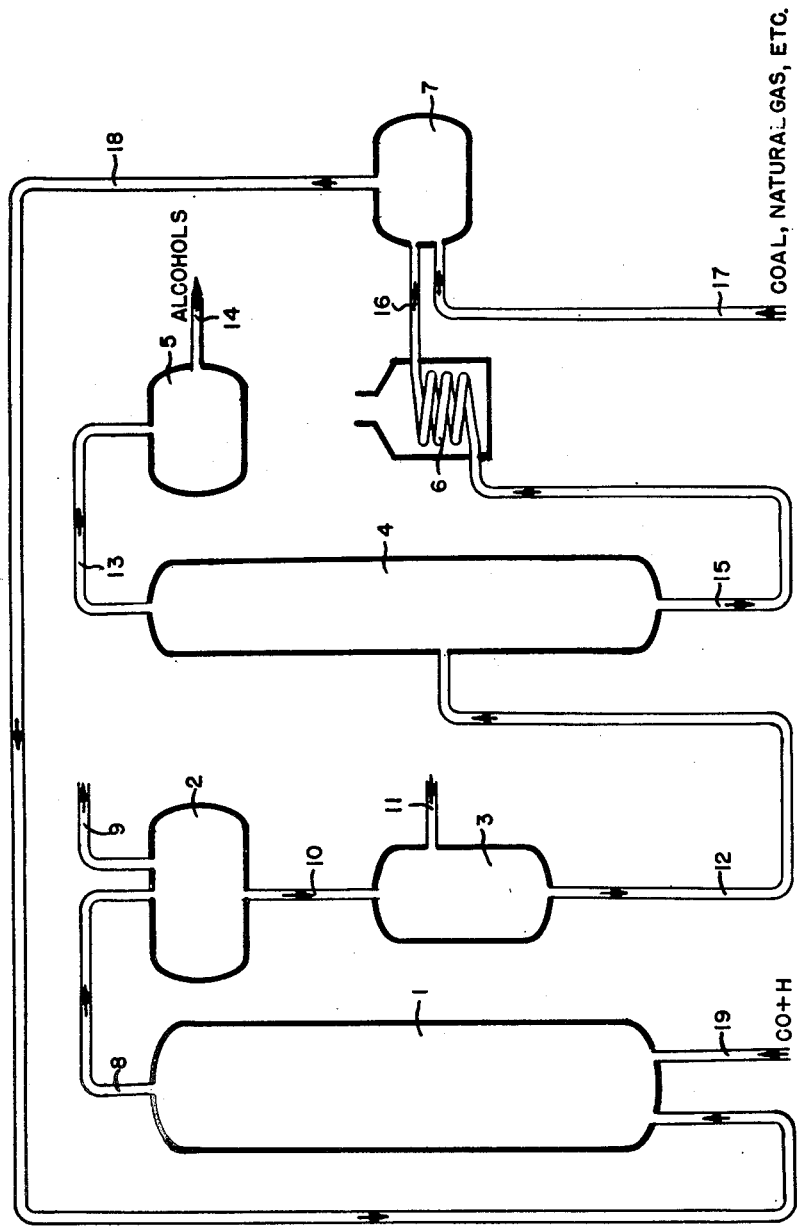

2,574,469

UNITED STATES PATENT OFFICE 2,574,469

METHOD OF UTILIZING AQUEOUS-ORGANIC CHEMICAL WASTES FROM THE FISCHER-TROPSCH PROCESS

Russell G. Dressler and John Russell Bircher, Louisiana, Mo., assignors to the United States of America as represented by the Secretary of the Interior Application March 21, 1950, Serial No. 151,026

3 Claims. (Cl. 260—450)

(Granted under the act of March 3, 1883, as amended April 30, 1928; 370 O. G. 757)

Our invention relates to recovery of valuable products that are otherwise lost in a gas synthesis plant.

An object of our invention is to provide a method and apparatus to recover residual alcohols and other materials from the usual waste effluent of such a plant.

A further object of our invention is to utilize waste products to contribute to the over-all operation and efficiency of a gas synthesis plant.

A better understanding of our invention can be had by referring to the accompanying drawing which is a schematic representation of the arrangement and cooperation of the various steps in the practice of our invention and of the equipment used to carry out the process.

The Fischer-Tropsch process is well known and is used for the making of synthetic liquid fuels by treatment of carbon monoxide and hydrogen in the presence of a catalyst. In the process fairly large amounts of water are formed as well as lesser amounts of oxygenated organic chemicals. The quantity of these produced chemicals varies according to the exact process used but are normally in the range of 5–20 percent of the weight of hydrocarbons produced in the Fischer-Tropsch synthesis. The chemicals predominate in ethyl alcohol which may be of the order of 40 percent of the total oxygenated compounds made. Acetic acid is normally second in predominance, and may amount to 25 percent of the total. Other chemicals contained consist of some of the 2, 3, 4 and 5 carbon chain compounds classified as aldehydes, ketones, alcohols and acids.

In the Fischer-Tropsch process, as conventionally practiced, the unconverted gases containing product vapors are led into one or more condensers where hydrocarbons, water and oxygenated chemical vapors are condensed, and the unreacted gases pass through the condenser practically unaffected. The condensates are collected and, on standing, separate into two layers, the upper one consisting of the hydrocarbons produced and the lower layer containing a water solution of the oxygenated chemicals. The hydrocarbon layer is the principal and desired product. The mixed water and chemical layer is considered to be of secondary importance. It is with the utilization and disposal of the latter layer that this invention is concerned.

The steps in our process and the equipment used to carry out our process can best be understood by reference to the drawing, which is schematic and only for purpose of explanation.

Fresh carbon monoxide plus hydrogen gas, or after preheating if desired, enters the Fischer-Tropsch reactor 1 through line 19. In the reactor 1 conversion of the carbon monoxide plus hydrogen to synthetic liquid fuels takes place in the presence of a catalyst at temperatures normally in the range of 450° F. to 600° F. The unconverted gas and vaporized products leave through line 8 and are condensed in condenser 2, the uncondensed gas leaving through line 9 and the condensate through line 10. The condensate, composed of hydrocarbons, water, and oxygenated chemicals, enters decanter 3. The hydrocarbons leave decanter 3 through line 11 while the aqueous solution of chemicals, which separated as a layer in decanter 3, is removed through line 12. The aqueous solution of chemicals in line 12 then enters the distillation column 4 where the low boiling fraction is the overhead product and leaves column 4 through line 13. This fraction consists chiefly of ethyl alcohol with some amounts of methyl alcohol, aldehydes and ketones, in vaporized state. They are condensed in the alcohol condenser 5 and are thence drawn off continuously through line 14 either for use or for further refining. The high boiling fraction which is separated in distillation column 4 is drawn off continuously through line 15 as a bottom product. This stream of high boiling fractions consists principally of water with variously large amounts of acetic acid and lesser amounts of the higher boiling alcohols, aldehydes, acids and ketones. This stream is evaporated and, if desired, superheated to temperatures up to 1500° F. in evaporator and superheater 6 after which it enters the gasifier 7 through line 16. In the gasifier the organic chemical content of this stream is decomposed to produce carbon monoxide and hydrogen. The steam content of this stream reacts at high temperatures (normal range 2000–3000° F.) with coal or natural gas and oxygen or air which enter the gasifier through line 17 to produce additional amounts of carbon monoxide and hydrogen. The total product from the gasifier, consisting of carbon monoxide and hydrogen with some carbon dioxide and minor amounts of other gases, leaves gasifier 7 through line 18 and if desired is preheated, passing thence to the Fischer-Tropsch synthesis reactor 1 to complete the cycle of operation. Thus it can be seen that a waste product, namely, the organic acids and part of the chemicals and the water, which is produced in the Fischer-Tropsch synthesis reactor 1, is utilized in the gasifier to in turn produce raw materials which are cycled back to the Fischer-Tropsch synthesis reactor I A number of technical factors must be considered in carrying out our process. One is that the aqueous condensates that are evaporated and superheated, due to their organic acid content, may be somewhat corrosive. Stainless steels or alloys, for example, containing high amounts of nickel, with 14–19 percent molybdenum, 4–8 percent iron, 0.04–0.15 percent carbon, 12–15 percent chromium, 3.0–5.5 percent tungsten, or the use of other non-corrosive materials may be required in the construction of proper apparatus for this step in our process. It is quite certain that the conventional type of water-steam boiler will not be used, but one may be designed with non-corrosive materials similar to this design or resembling the conventional tube still apparatus.

In the operation of a 10,000 barrel per day synthetic fuels plant, hydrocarbons as well as aliphatic, oxygenated organic compounds consisting of both water-soluble and oil-soluble types are obtained. Separation of the water solution of aliphatic, oxygenated organic compounds from the oil phase is readily accomplished by means of conventional decanters or separators into which the condensed hydrocarbons, water and aliphatic, oxygenated organic compounds are conducted. In such a plant approximately 94,725 pounds per hour of an aqueous condensate containing 9,922 pounds of oxygenated organic compounds are obtained. These oxygenated organic compounds comprise alcohols, aldehydes, ketones and acids, in such approximate proportions that the alcohols, aldehydes and ketones comprise about 75 percent, and the acids 25 percent of the total oxygenated organic compounds.

It is common knowledge that distillation of an aqueous solution containing the several classes of oxygenated compounds will result in the alcohols, ketones and aldehydes together with some water being vaporized and recovered as an overhead product with the simultaneous production of a bottoms product containing all of the acids and the major portion of the water. In the distillation of the aqueous condensate referred to above the following distribution could be anticipated, the rates being in pounds per hour.

```
                                      Pounds per hour
Feed:
   Water _____ 84,803
   Aliphatic, oxygenated organic com-
      pounds _____ 9,922
                                      ------
      Total _____ 94,725
Top product:
   Water _____ 1,312.2
   Alcohol, ketones and aldehydes____ 7,441.5
                                      ------
      Total _____ 8,753.7
Bottom product:
   Water _____ 83,489.8
   Organic acids _____ 2,480.5
                                      ------
      Total _____ 85,970.3
```

As previously mentioned, it is desired to utilize the bottoms from this distillation in the gasification step to produce additional quantities of synthesis gas but it is now also clear that it is important also to reduce the quantity of water required for steam production used in the gasifier. The reduction in water requirements would be approximately 83,490 pounds per hour or 10,000 gallons per hour. In the gasification procedure we propose, the bottoms product would be vaporized and introduced into the gasifier where the organic acids would be converted into synthesis gas while the water, in the form of steam, assists in the gasification of coal. If the acids are considered to be acetic acid, the following reaction represents the gasification step:

$$CH_3COOH + O_2 \rightarrow 2CO + 2H_2O$$

Thus the organic acids are converted to carbon monoxide and steam, and the 2,480.5 pounds of organic acids would produce 2,305.6 pounds of carbon monoxide which is equivalent to approximately 31,200 SCFH.

It must be realized that an equilibrium between the steam and carbon monoxide product gases is set up and that a mixture of hydrogen, carbon monoxide and carbon dioxide will result. However, there should not be an appreciable change in the volume mentioned above when on a carbon dioxide-free basis. This is borne out in the following reaction:

$$CO + H_2O \rightleftharpoons CO_2 + H_2$$

It is to be pointed out that in feeding organic material to such a gasifier operating at temperatures above 1500° F., all of the organic material is decomposed to gaseous products and no amount of residue remains to present a disposal problem.

Passing now to the economics, public health and sanitation considerations, one must recognize that the yield of water and of oxygenated organic chemicals from a number of Fischer-Tropsch plants is of considerable magnitude. It can be shown that 15 or 20 plants of such size to produce 10,000 barrels per day of hydrocarbons each, would yield a total production of some of the more common chemicals such as alcohol, acetone, acetic acid, etc., to be equivalent to the present United States production of such materials, which without the practice of our invention would be wasted.

The recovery or disposal of such large amounts of chemicals or disposal of water streams containing chemical contaminants has been a problem. They cannot be burned effectively without concentrating, since normally they are produced as 10 percent by weight of chemicals in water solution. Government, State and municipal laws and restrictions limit the possibility of discharge of these materials into public waters without treatment. Their treatment would normally involve a large capital investment in treating plants and further a costly maintenance for materials necessary to neutralize these wastes.

In our invention the oxygenated chemicals in water solution, after condensing from the Fischer-Tropsch reaction, are separated by decantation from the hydrocarbon products, are topped in a fractionating column and the bottoms are evaporated and superheated in suitable apparatus and then introduced in vapor form into a gasifier from which materials additional amounts of carbon monoxide and hydrogen are made. This step solves the disposal problem. The carbon monoxide and hydrogen are then utilized as raw material to the Fischer-Tropsch process and by using this step we have a supplemental source of material. Thus according to our invention a serious disposal problem has been circumvented and the waste material has been used gainfully to produce more of the desired hydrocarbon product.

These economies are also applicable in the coal hydrogenation process as usually practiced, the waste waters from such plants normally containing, as they do, various percentages of phenols. These materials are normally considered a great disadvantage in the system in that special treatment must be given to the waste water for their removal and carried to a very low parts-per-million content before such waste waters can be discharged into rivers or streams. In the practice of our invention the waste waters from the coal hydrogenation process containing phenols or other unwanted chemicals are collected separately, evaporated and superheated if desired, and thereafter fed as steam to a coal gasification unit for the production of hydrogen required in the coal hydrogenation process.

Further consideration of the economics shows valuable yields from the distillation or topping operation, chiefly ethyl alcohol, along with minor amounts of methyl alcohol, water and other organic chemicals. The ethyl alcohol can be concentrated and purified and sold in pure form or it can be concentrated and used as a burning fuel, or at least be available for any use desired. In other practices employed heretofore, this has been lost.

The ethyl alcohol content is considered to be worth recovering because of its versatility in uses and because of the simplicity of its separation from the bulk of the water. However, the remaining organic chemicals mainly acetic acid in dilute water solution involve complicated processes for their separation and recovery and, for that reason, are decomposed to yield carbon monoxide and hydrogen needed in the Fischer-Tropsch process.

We realize the important matter of efficiency in any system and we have described in the foregoing specification a gas synthesis system without the disadvantages of systems heretofore used, with efficiencies not heretofore attained, and it is to be understood that the practice of our invention is not to be limited by the specification or drawing but only by the scope of the appended claims.

The invention herein described and claimed may be manufactured and used by or for the Government of the United States of America for governmental purposes without the payment of any royalties thereon or therefor.

What we claim is as follows:

1. A process for the production of liquid hydrocarbons and oxygenated organic compounds from carbonaceous materials involving maximum utilization of acid-contaminated waste waters produced in the process, comprising the steps of converting a carbonaceous material to a synthesis gas comprising a mixture of hydrogen and carbon monoxide by reaction of said material with steam at elevated temperatures in a first reaction zone, passing said synthesis gas to a second reaction zone where said gas is reacted in the presence of a catalyst to produce a product comprising a nonaqueous portion including liquid hydrocarbons and oxygenated organic compounds normally insoluble in water, and an aqueous portion containing dissolved, water-soluble, oxygenated organic compounds including relatively low boiling water soluble oxygenates consisting chiefly of alcohols, aldehydes, and ketones, and likewise including relatively high boiling, water soluble oxygenates consisting chiefly of organic acids, separating said nonaqueous portion from said aqueous portion, separating said relatively low boiling, water soluble oxygenates from said aqueous portion thereby leaving a dilute aqueous solution containing the bulk of the higher boiling water soluble oxygenates, including substantially all the organic acids originally present in said aqueous portion, and then passing this dilute acid-containing solution to said first reaction zone, whereby the water and the carbon values contained in said acid-contaminated solution are employed for the production of synthesis gas for said second reaction zone, thereby making effective utilization of an otherwise waste product of highly corrosive properties, and at the same time eliminating disposal problems connected therewith.

2. A process for the production of liquid hydrocarbons and oxygenated organic compounds from solid carbonaceous materials, involving maximum utilization of acid-contaminated waste waters produced in the process, comprising the steps of gasifying a solid carbonaceous material by reaction with steam in a gasification zone to produce a synthesis gas comprising a mixture of hydrogen and carbon monoxide, passing said hydrogen and carbon monoxide mixture to a catalytic reaction zone where said mixture is reacted in the presence of a catalyst to produce a product comprising a nonaqueous portion including liquid hydrocarbons and oxygenated organic compounds normally insoluble in water, and an aqueous portion containing dissolved, water soluble, oxygenated organic compounds, including relatively low boiling water soluble oxygenates consisting chiefly of alcohols, aldehydes, and ketones, and likewise including relatively high boiling water soluble oxygenates, consisting chiefly of organic acids, separating said nonaqueous portion from said aqueous portion, separating said relatively low boiling water soluble oxygenates from said aqueous portion thereby leaving a dilute aqueous solution containing the bulk of the higher boiling oxygenates including substantially all the organic acids originally present in said aqueous portion, and then passing this dilute acid-containing solution to said gasification zone whereby the water and the carbon values are employed for the production of synthesis gas for said second reaction zone, thereby making effective utilization of an otherwise waste product of highly corrosive properties, and at the same time eliminating disposal problems connected therewith.

3. A process for the production of liquid hydrocarbons and oxygenated organic compounds from solid carbonaceous materials, involving maximum utilization of acid-contaminated waste waters produced in the process, comprising the steps of gasifying a solid carbonaceous material by reaction with steam in a gasification zone to produce a mixture of hydrogen and carbon monoxide, passing said hydrogen-carbon monoxide mixture to a catalytic reaction zone where said mixture is reacted in the presence of a catalyst to produce a product comprising a nonaqueous portion including liquid hydrocarbons and oxygenated organic compounds normally insoluble in water, and an aqueous portion containing dissolved water soluble oxygenated organic compounds, including relatively low boiling water soluble oxygenates consisting chiefly of alcohols, aldehydes, and ketones, and likewise including relatively high boiling water soluble oxygenates consisting chiefly of organic acids, separating said nonaqueous portion from said aqueous portion, distilling said aqueous portion to remove therefrom said relatively low boiling water soluble oxygenates thereby leaving a dilute aqueous solution containing the bulk of the higher boiling oxygenates including substantially all the organic acids originally present in said aqueous portion, passing this dilute acid-containing solution to a vaporization zone to effect complete vaporization thereof, and then passing the heated vapors to said gasification zone, whereby the water and the carbon values contained in said acid-contaminated solution are employed for the production of synthesis gas for said catalytic reaction zone, thereby making effective utilization of an otherwise waste product of highly corrosive properties, and at the same time eliminating disposal problems connected therewith.

RUSSELL G. DRESSLER.
J. RUSSELL BIRCHER.

REFERENCES CITED

The following references are of record in the file of this patent:

UNITED STATES PATENTS

| Number | Name | Date |
|---|---|---|
| 2,436,938 | Scharmann et al. | Mar. 2, 1948 |
| 2,472,219 | Lyons | June 7, 1949 |
| 2,482,284 | Michael et al. | Sept. 20, 1949 |
| 2,499,372 | D'Ouville | Mar. 7, 1950 |

FOREIGN PATENTS

| Number | Country | Date |
|---|---|---|
| 326,910 | France | Mar. 9, 1903 |

OTHER REFERENCES

Journal of the Institute of Petroleum, vol. 33, No. 286, Oct. 1947, pages 617–619.